US009185536B1

(12) United States Patent
Johnson et al.

(10) Patent No.: US 9,185,536 B1
(45) Date of Patent: Nov. 10, 2015

(54) APPARATUS AND METHOD FOR OBTAINING INCONSPICUOUS USER INPUT ON A MOBILE DEVICE

(71) Applicants: Peter R. Johnson, Minnetonka, MN (US); James Evan Johnson, Minnetonka, MN (US)

(72) Inventors: Peter R. Johnson, Minnetonka, MN (US); James Evan Johnson, Minnetonka, MN (US)

(73) Assignees: Peter R. Johnson, Minnetonka, MN (US); James Evan Johnson, Minnetonka, MN (US)

( * ) Notice: Subject to any disclaimer, the term of this patent is extended or adjusted under 35 U.S.C. 154(b) by 357 days.

(21) Appl. No.: 13/621,659

(22) Filed: Sep. 17, 2012

Related U.S. Application Data

(60) Provisional application No. 61/535,714, filed on Sep. 16, 2011.

(51) Int. Cl.
*H04W 4/22* (2009.01)
(52) U.S. Cl.
CPC ....................................... *H04W 4/22* (2013.01)
(58) Field of Classification Search
CPC ....................................................... H04W 4/22
USPC .................. 455/404.1, 404.2, 567, 550.1, 455/556.1–556.2
See application file for complete search history.

(56) References Cited

U.S. PATENT DOCUMENTS

| 8,280,038 | B2 | 10/2012 | Johnson et al. | |
| 8,290,537 | B2 | 10/2012 | Lee et al. | |
| 8,768,294 | B2 * | 7/2014 | Reitnour et al. | 455/404.2 |
| 8,862,092 | B2 * | 10/2014 | Reitnour | 455/404.2 |
| 2008/0318629 | A1 | 12/2008 | Inha et al. | |
| 2010/0111349 | A1 | 5/2010 | Devlas et al. | |
| 2010/0272252 | A1 * | 10/2010 | Johnson et al. | 379/430 |
| 2011/0319051 | A1 * | 12/2011 | Reitnour | 455/404.2 |
| 2012/0282886 | A1 | 11/2012 | Amis | |

FOREIGN PATENT DOCUMENTS

| EP | 1265422 A1 | 12/2002 |
| EP | 2410717 A1 | 1/2012 |
| EP | 2495989 A2 | 9/2012 |
| WO | WO2006/045617 | 5/2006 |

OTHER PUBLICATIONS

"IHelpPlus" http://itunes.apple.com/us/app/ihelpplus-personal-alarm-panic/id537514084?mt=8 dated Dec. 6, 2012.

* cited by examiner

*Primary Examiner* — Sharad Rampuria
(74) *Attorney, Agent, or Firm* — Christensen Fonder, P.A.

(57) ABSTRACT

Mobile device, method for operating the same, and associated computer-readable instructions on a non-transitory medium for obtaining inconspicuous user input on a mobile device. The mobile device automatically detects whether an accessory port is engaged with an accessory, such as a headset, for example. In response to at least one change in an indication of the detection, the device automatically performs a sequence of operations. According to one particular embodiment, alarm sequence of operations can include a transmission of an alarm notification to a predefined recipient, for example.

18 Claims, 5 Drawing Sheets

APPARATUS AND METHOD FOR OBTAINING INCONSPICUOUS USER INPUT ON A MOBILE DEVICE

PRIOR APPLICATION

This Application claims the benefit of U.S. Provisional Application No. 61/535,714, filed Sep. 16, 2011, the disclosure of which is incorporated by reference herein.

FIELD OF THE INVENTION

This invention relates generally to mobile electronic devices and applications thereof. More specifically, embodiments of the present disclosure relate to mobile device-based apparatus and related methods that provide a non-conventional means for receiving user input. Principles of the invention are applicable in a personal protection application in a mobile device, for example.

BACKGROUND OF THE INVENTION

The ever rising power and decreasing cost of mobile devices have steadily increased the presence of such devices in society. In one of the first big leaps in mobile technology, mobile devices, such as smartphones, gained the ability to send and receive e-mail. Later, these devices added music player functionality. Currently, many mobile devices are able to function as turn-by-turn navigation systems and many also contain the ability to access the interne for web browsing and even video streaming. Additionally, many mobile devices, similar to general purpose computers, have the ability to run stand-alone applications which even further increase their functionality. As the number of functions has increased for these devices, they have become an invaluable accessory for many people.

A need exists for mobile devices and mobile device applications to help a user in emergency situations, such as a confrontation with a would-be attacker or thief. Indeed, the use of mobile devices with a conventional user interface may well decrease the overall safety of a mobile device user since the user is often focused on interacting with the mobile device instead of watching his or her surroundings. Although mobile devices provide various means for communicating with others, in situations when a user is approached by a would-be attacker or thief, the user is usually not in a position to use the mobile device to place a phone call or send a text message or e-mail notifying people or organizations that he or she is in a dangerous situation. These options are generally unavailable in such situations because they require time and overtly noticeable movements. If a mobile device user were to attempt to alert others of the situation by way of a mobile device, the would-be attacker or thief could interpret that as a provocation and respond with increased violence in an attempt to prevent the communication.

A number of applications have been developed to assist people in such emergency situations by allowing a mobile device user to more quickly alert others. However, these applications suffer from the same problem as trying to place a normal phone call or text message—they require too much time and interaction with the device's user interface to be useful in risky situations. Therefore, an option is needed to allow those in dangerous or emergency situations to quickly alert others that they are in a dangerous situation while avoiding drawbacks such as those discussed above.

SUMMARY OF THE INVENTION

Aspects of the present invention relate to receiving user input on a mobile device using an accessory port. This approach finds many types of applications, one of which is for a personal protection module (PPM) that increases the personal safety of a mobile device user. The PPM is generally configured to run on a mobile device such as a smartphone, tablet, or music playing device. The device generally includes a computing system having a power system with an on-board energy source, and a processor operatively coupled with a data storage arrangement and a network interface, such as a 3G/4G network, Wi-Fi network, or the like. The device can also include an accessory port, such as a headset plug, for example, and the device may include at least a GPS network interface.

An electronic mobile device according to one embodiment includes a housing, computer circuitry situated within the housing and including a processor operatively coupled to a data store, a user interface including a display and a user input device, and wireless communications circuitry, and an accessory port interfaced with the computer circuitry and including an electrical connector configured to engage with an accessory external to the housing.

The computer circuitry stores an application on the computer circuitry, the application, when executed, causes the computer circuitry to execute a sequence of operations in response to at least one change in the indication of the detector module.

The computer circuitry stores an application that, when executed, causes the computer circuitry to execute a sequence of operations in response to at least one change in the indication of the detector module, the sequence of operations not requiring operation of the accessory.

In one embodiment, the application implements a personal protection module via the computer circuitry, the personal protection module being configured to activate an alarm sequence in response to the at least one change in the indication of the detector module.

In one embodiment, the alarm sequence causes the electronic mobile device to transmit an alarm message via the communications circuitry following a specified time period in response to the at least one change in the indication of the detector module. This time period allows the user to cancel the alarm sequence. In another embodiment, the personal protection module is configured enter into an armed state in response to a user input. In the armed state the personal protection module permits activation of the alarm sequence; out of the armed state the personal protection module prevents activation of the alarm sequence. In a related embodiment, the personal protection module is configured automatically exit the armed state in response to a lapse of a predefined period of time following entry into the armed state. A number of other optional features are described below, and optionally constitute a part of the invention, insofar as they are called out in the claims.

Advantageously, various embodiments of the invention permit inconspicuous operation of a mobile device, which can provide increased safety for the user in certain situations. In an example embodiment, a quick and inconspicuous alarm communication can be transmitted to a remote recipient indicating that the mobile device user is in need of emergency assistance. Other advantages will become apparent from the following Detailed Description.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Although today's practical mobile devices tend to utilize certain technologies predominantly, such as CMOS-based microcontrollers, DRAM, Flash non-volatile memory, radio frequency devices for communications, batteries for energy storage, and the like, it should be understood that the invention is in no way limited to any particular set of technologies. Below, the important components of such a mobile device will be described, along with commonly used technologies used to implement such components. However, this should not be construed as limiting the device to components implemented by using the specific, listed technologies.

Figure 1:
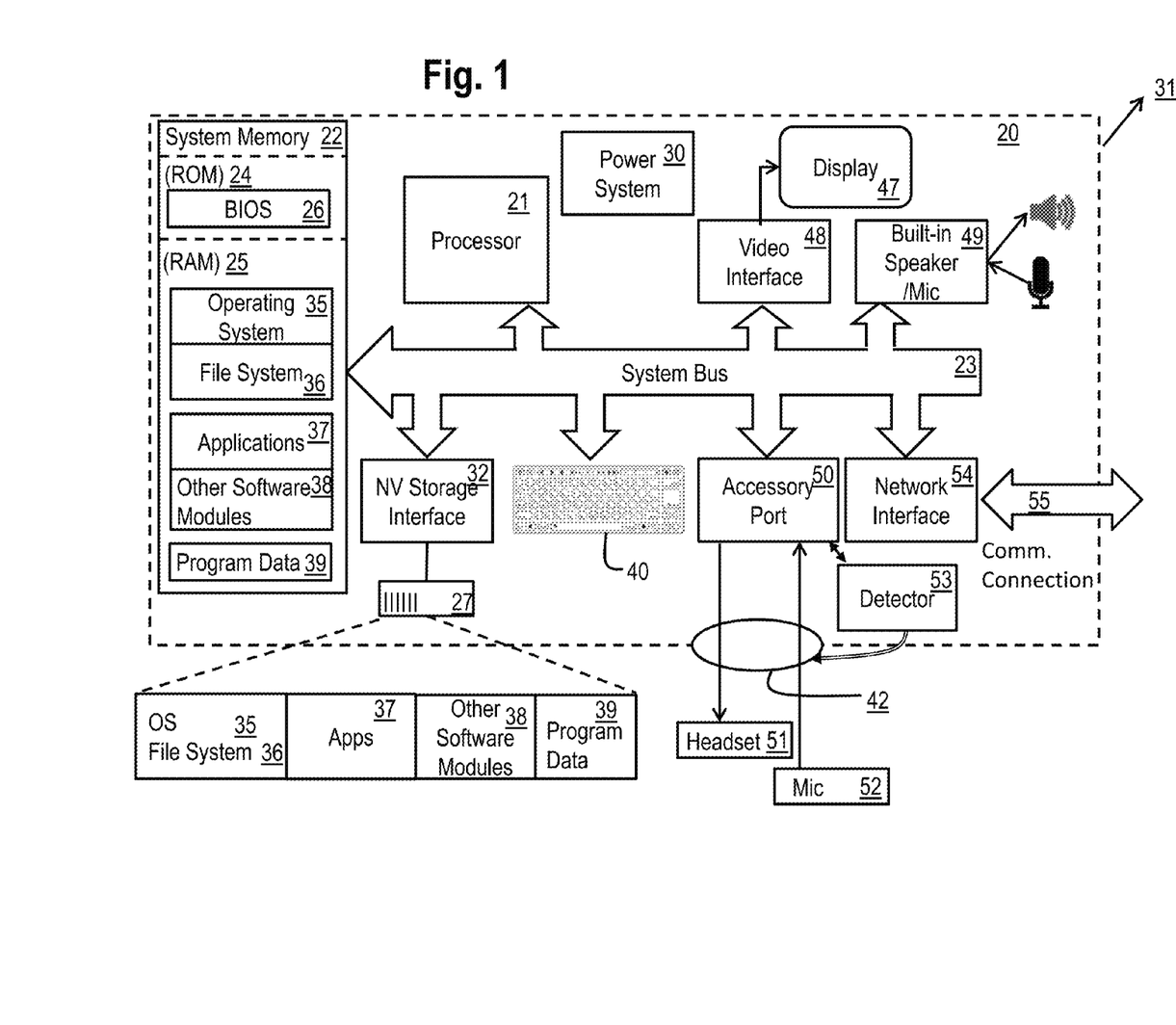
FIG. 1 is a block diagram illustrating a general-purpose mobile device upon which the present invention may be implemented according to various embodiments of the invention.

FIG. 1 is a block diagram illustrating a system of a general-purpose mobile device 20 comprising a housing 31, computing system that includes processor 21, system memory 22 and system bus 23, which contains various system components. These components are implemented in hardware using suitable circuitry. System bus 23 is implemented as any conventional bus structure including a memory bus or memory controller, a peripheral bus, and a local bus, which can interact with any other bus architecture. System memory includes read only memory (ROM) 24, random-access memory (RAM) 25, basic input/output system (BIOS) 26, containing the basic procedures that ensure the transfer of information between the elements of the mobile device 20, for example, at boot time, using the ROM 24.

Mobile device 20 further includes a non-volatile storage 27 (such as a Flash EEPROM device or hard disk drive, for example, which can include either removable or non-removable media) for reading and writing information. Non-volatile storage 27 is connected to the system bus 23 via the non-volatile storage interface 32. Non-volatile storage 27 is used to store computer instructions, data structures, code for modules and other code or data of the mobile device 20.

Terms such as "computer-readable medium," "machine-readable storage media," "data storage arrangement," and the like, are meant to encompass devices such as non-volatile storage 27 and system memory 22.

Some of the software modules, such as an operating system 35 are stored on non-volatile storage 27, ROM 24 or RAM 25. Mobile device 20 has a file system 36, in which are stored an operating system 35 and additional software applications 37, other modules 38 and program data data 39.

A display 47 is coupled to processor 21 via system bus 23 and an interface such as a video interface 48. Also, built-in audio devices, such as a speaker and microphone, are interfaced with system bus via interface 49. The user is provided the ability by operating system 35 to enter commands and information into mobile device 20 through a user interface, including a user input device 40, such as a touchscreen, for example, which in a practical embodiment is implemented with suitable sensors, analog-to-digital circuitry for interfacing the sensors to the processor 21 via system bus 23, for example.

Accessory port 50 provides an interface for external accessories such as a headset 51, microphone 52, digital data input/output, external video, etc. For example, the accessory port can interface with the computer circuitry and can include an electrical connector configured to engage with an accessory external to the housing. For example, the accessory port 50 can comprise a combination headset/microphone jack 42. Accessory port 50 can include a mechanical connector, such as a headset jack, universal serial bus (USB) connector, High-Definition Multimedia Interface (HDMI) port, and the like. Also, accessory port may include a wireless interface such as a personal area network (PAN) interface, e.g., Bluetooth. For headsets, preferably, a connector for headset 51 is sized to receive a common 3.5 mm headset plug, but in other embodiments headset jack can be any of a variety of sizes. Other headset jack sizes may be 2.5 mm, a common size for microphones or hands-free cellular headset sets, or 6.35 mm, a common size for many music listening head-sets. Additionally, the headset jack can be configured to accept headset plugs with two, three, four, or more separate conductors, such as for headset accessories with separate conductors for headset-left, headset-right, and a microphone. Some devices use specialized dedicated pins of a USB-style connector for such analog signals. A variety of mechanical configurations are contemplated according to different embodiments.

Accessory port 50 further includes a port state detector 53. The port state detector 53 includes a circuit that detects an operational state of the various connectors associated with accessory port 50. For example, detector 53 can provide an indication to processor 21 as to whether a pluggable accessory (such as a headset, microphone, or the like) is engaged with its respective connector. Typically, applications 37 running on processor 21 can inquire, via the operating system 35, as to the state of the accessory port and, based thereupon, change their operation. For instance, upon detection of engagement of a headset plug, an application that provides audio output can switch from providing that output through the built-in speaker of the device, to routing the sound output to the headset that is now engaged. Detector 53 can accomplish this in a number of different ways, including utilizing a spring-loaded switch or sensing the impedance across certain contacts of the accessory connector.

Mobile device 20 can operate in a networked environment, using communicative connection 55 established via network interface 54 to a mobile data network, or one or more remote devices. Remote connections can comprise other mobile devices, network infrastructure (such as cellular towers or wireless access points or similar structures), Global Positioning Satellites (GPS), servers, computers, or any other device that is able to connect to the mobile device 20 through communicative connection 55. Communicative connection 55 may be implemented via GPS radio, GSM, CDMA, UMTS, WiFi, WIMAX, LTE, IMT-Advanced, and other mobile communication standards, or any combination thereof.

Mobile device 20 can include sensors and circuitry for a variety of additional functionality. For example, mobile device can include a global positioning system (GPS) receiver that is interfaced with processor 21 via the system bus. Also, various magnetic field sensors may be included that can detect an orientation of mobile device 20. Similarly, an accelerometer may be included to detect motion of the device along one or more degrees of freedom. In addition, a video camera may be included that can record still images, motion video, or both. All of these additional circuits may be suitably interfaced with processor 21 and made available for use by applications and other software modules via operating system 35.

Mobile device 20 has a power system 30 that includes an on-board energy source (such as a battery, for instance), along with power regulation circuitry for delivering power from the on-board energy source or from an external source at the appropriate voltages for use by the other circuitry. For example, the power system can comprise a power supply that provides power to the computer circuitry, user interface, and wireless communications circuitry, the power supply including an on-board energy source. Power system 30 can also include a charging circuit for controlling delivery of externally-applied power to the battery during charging.

One aspect of the invention is directed to a technique for inconspicuous control of the mobile device using the accessory port as a signaling input. Various uses for this technique are contemplated, one of which is a personal safety module (PPM). The following description will be in the context of operation of a PPM, though it will be readily apparent that other uses for the signaling technique are possible, and are intended to be within the scope of the invention unless specifically limited by the claims.

In one embodiment of the invention, mobile device 20 also contains a personal protection module (PPM) 100. The term "module" as used herein means a real-world device or component implemented using hardware, such as by an application specific integrated circuit (ASIC) of field-programmable gate array (FPGA), for example, or as a combination of hardware and software, such as by a microprocessor system and a set of instructions to implement the security module functionality. A module can also be implemented as a combination of the two, with certain functions facilitated by hardware, and other functions facilitated by a combination of hardware and software. In certain implementations, at least a portion, and in some cases, all, of a module can be executed on the processor of the mobile device that executes application programs, such as processor 21 of mobile device 20. Accordingly, PPM 100 can be realized in a variety of configurations, and should not be limited to any particular implementation exemplified herein. In one particular embodiment, PPM 100 is implemented using the computing hardware of mobile device 20 operating under the control of the operating system and of a specialized personal protection application.

Figure 2:
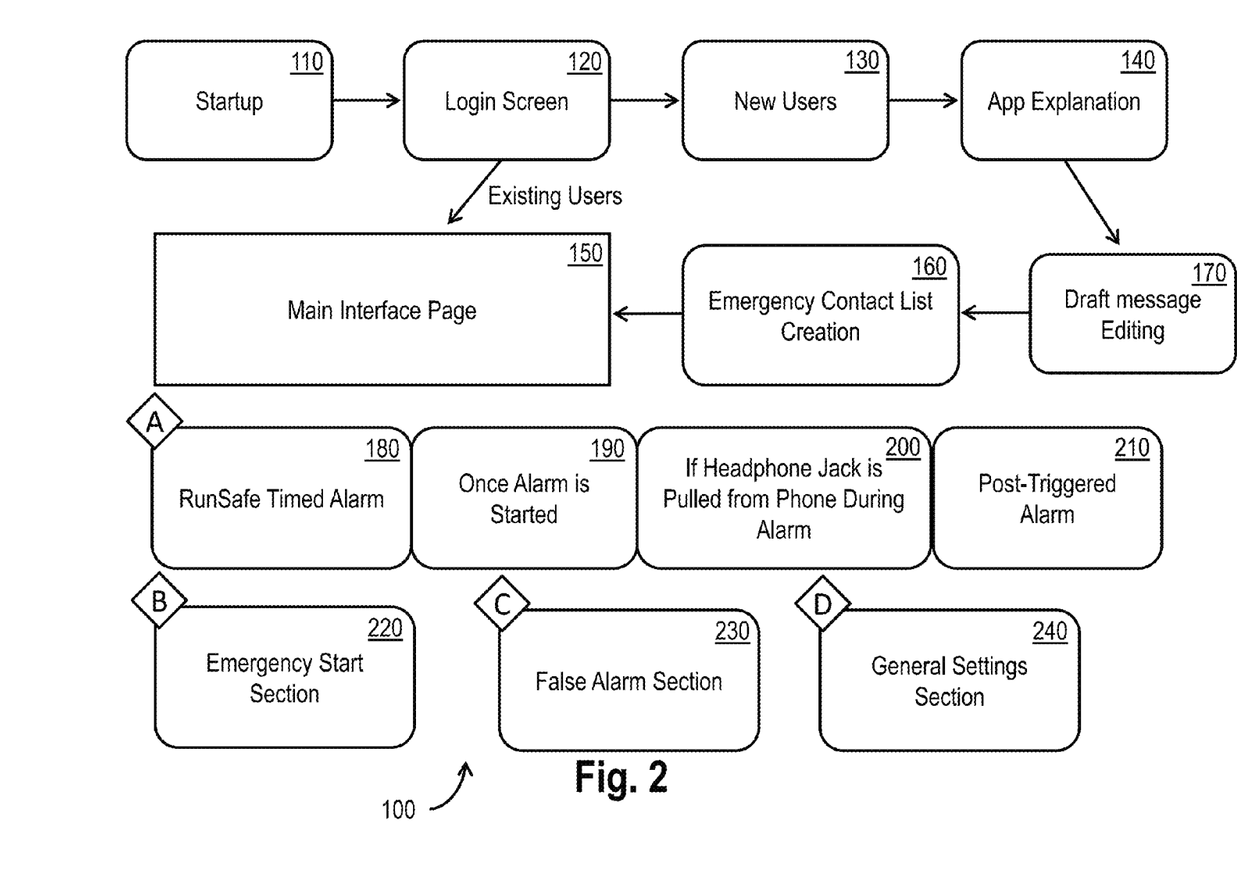
FIG. 2 illustrates an exemplary operational flow and various features according to one embodiment of the present invention.

FIG. 2 is a diagram illustrating the operational flow and various features of PPM 100 according to one embodiment. In one embodiment, PPM 100 operates according to execution of instructions by processor 21. The instructions for implementing PPM 100 may be stored in non-volatile storage 27. When executed as one or more processes, parts, or all, of the PPM 100 may also be stored in system memory 22. PPM 100 may read and write data to portions of the system memory 22 and the non-volatile storage 27. The data may include variables relating to account information associated with PPM 100 and GPS coordinates and other location data, among various other operational parameters.

By using the input device 40, a user may start up PPM 100. Block 110 depicts various operations that PPM 100 may perform upon start up. Upon starting, PPM 100 may prompt the user to allow PPM 100 to use location services located on the mobile device. Location services can include determining location by communicating with GPS, cellular towers, and wireless access points. If the user does not turn on location services, the user can be prompted to restart PPM 100, which can once again lead to prompting the user to turn on location services. Once the user turns on location services, the user can then be directed to the login screen.

In a related embodiment, PPM 100 may be configured to start automatically in response to certain events or predefined conditions. One way PPM 100 can accomplish this function is by continuously running in the background as a service on the mobile device. Example triggering events may include starting a music service, moving the mobile device at a certain velocity or with a certain shaking or twisting pattern, plugging in headsets, or any combination. Other triggering events and conditions are contemplated.

Block 120 represents a login prompt or login screen that PPM 100 may display when PPM 100 starts up. If PPM 100 does not detect any account information stored on the mobile device, the user will be prompted to create a new account (e.g., the first time the user logs in). If the user already has an account with user information that is detected by PPM 100, the user can be automatically logged in by checking an auto-login box. Block 130 depicts an interactive process for creating a new user account (e.g., click a new user prompt), if necessary, including prompting the user to create a secure username and password requiring email authentication. This process may be interactive with a cloud processing service that establishes the user account in a centralized manner. If the username is already in use, the user can be prompted to enter another username that is available. If not in use, the user can be prompted to reenter the username and password. Other embodiments may employ different processes, such as utilizing a user account associated with a pre-configured service such as with Google®, iTunes®, Facebook® or the like. In yet another embodiment, the PPM may operate without requiring there to be a user account.

If PPM 100 created a new account after starting up, PPM 100 may display a screen explaining the purpose and operation of PPM 100. Block 140 includes various portions of the PPM 100 for which PPM 100 may provide an explanation, including how PPM 100 works generally, how emergency messages can be sent (i.e., text messages or email messages), how to enter and communicate with emergency contacts, and how to communicate a false alarm message. Some embodiments may describe portions of the Module other than what is listed in Block 140.

In Block 170, PPM 100 provides a user-interactive process by which the user can configure and customize operation of PPM 100. For example, PPM 100 may display a screen that allows the user to draft emergency messages that can be sent later by the PPM 100. PPM 100 may provide an example emergency e-mail, text message (SMS), multimedia message (MMS), or other suitable message format. PPM 100 may also allow the user to edit or draft the emergency e-mail and text messages that can be sent later by the Module. The basic template of a notification message can include the GPS location or network-based location of the mobile device. PPM 100 may also allow the user to draft an e-mail that PPM 100 may send in case of a false emergency, i.e., inadvertent triggering of the alarm sequence. In some embodiments, PPM 100 may provide a default false alarm notification.

After drafting or editing the various e-mail and text messages PPM 100 may send, PPM 100 may prompt the user to create a list of emergency contacts. Block 160 describes one method by which PPM 100 allows the user to create the list of emergency contacts and to choose which contacts can be contacted during an emergency. The invention contemplates any suitable method of creating an emergency contact list. Contact information for the contacts on the emergency contact list can at least include an email address, but can also include a telephone number. In one embodiment, the emergency contacts can be sent an email or text message explaining that they are being used as an emergency contact by the user. This introductory message explains the general use and significance and use of the PPM 100 and provides an example of what an emergency notification can look like. In another embodiment, the emergency contacts can be given the option to subscribe to the user's emergency contact list or to unsubscribe from it.

Although FIG. 2 displays a particular sequence in which Block 140, Block 170, and Block 160 appear, the invention should not be construed as being limited by this order. Block 140, Block 170, and Block 160 are interchangeable and any of Block 140, Block 170, and Block 160 may appear before any other in the sequence.

Once PPM 100 has gone through the steps listed in Block 130, Block 140, Block 170, and Block 160, PPM 100 will display the Main Interface Page. Upon start up, if PPM 100 detects account information stored on the mobile device, PPM 100 may skip directly to the Main Interface Page without taking the actions described in blocks 130, 140, 160, and 170.

An example Main Interface Page is described by block 150. Other embodiments may contain more or fewer buttons than those listed in Block 150. As shown in FIG. 2A, the Main Interface Page A can contain buttons relating to a "RunSafe Timed Alarm" 180, relating to operations "Once the Alarm is Started" 190, relating to operations "If Headset Jack is Pulled from the Phone During Alarm" 200, and relating to operations "Post-Triggered Alarm" 210. In one embodiment, the "RunSafe Timed Alarm" will activate a triggered, Timed Alarm. Block 180 includes various portions of the PPM 100 for which PPM 100 may provide a Timed Alarm. For example, Block 180 includes an enlarged timer dial for the user to set the alarm duration (i.e., a jogging timer) and an enlarged start button. In one embodiment, the Alarm will not start until the headset 51 is plugged into headset jack.

Block 190 describes one embodiment of the PPM in which the RunSafe Timed Alarm button has been pressed. For example, an enlarged timer can appear at the top of the display, while the lower portion of the display appears as a normal audio player interface (e.g., options to choose a song, artist, or playlist). In one embodiment, the song duration can be excluded from the interface so as to avoid confusion with the Timed Alarm button. Additionally, Block 190 includes a stop timer button at the bottom of the screen. PPM 100 can also allow the user to set the Active Limit variable, which is the length of time that the Alarm will remain active. For example, if the user only intends to need to protection of PPM 100 for 30 min., the user may set the Active Limit to 30 min. PPM 100 may also allow the user to set the Alarm Timer Limit variable. The Alarm Timer Limit is the amount of time between when PPM 100 detects the removal of headset plug from headset jack and when PPM 100 sends out emergency messages. In some embodiments, PPM 100 may include preset amounts in both the Active Limit and Alarm Timer Limit variables.

PPM 100 may utilize the function of a timer to assist in tracking the time left in the Active Limit and the Alarm Timer Limit variables. The timer may be implemented in any number of ways which are well known in the art. A few examples include through a dedicated piece of hardware, such as a High Precision Event Timer, a software Module that interacts with the processor 21 running at a known frequency, or receiving updates from a remote device through communicative connection 55.

Once the user has set the Active Limit and Alarm Timer Limit to desired values, PPM 100 may arm a safety function. In at least one embodiment of the Module, PPM 100 will not arm the Safety function until PPM 100 detects a headset plug connected to headset jack.

PPM 100 may detect the presence or non-presence of a headset plug connected to headset jack through detector module 53. Detector module 53 may have a positive state and a negative state, with the positive state associated with the detection of an accessory (e.g., headset plug) connected to accessory port 50 (e.g., headset jack) and the negative state associated with nothing connected to the accessory port 50. Detector module 53 can send information about its state over system bus 23 to other components, such as processor 21, and the state of detector module 53 may be sensed by PPM 100. For example, the computer circuitry can be configured to implement PPM 100 configured to activate an alarm sequence in response to at least one change in the indication of the detector module.

Figure 3:
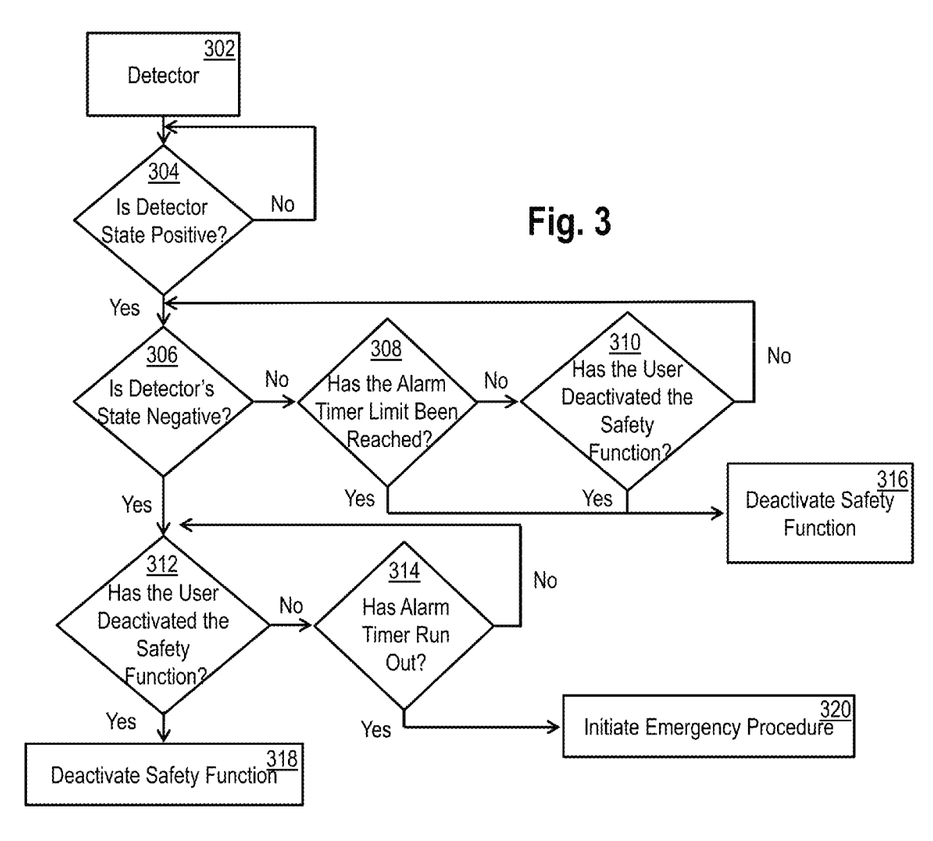
FIG. 3 illustrates an example of an Alarm Procedure that one embodiment of the invention may perform.

Once PPM 100 has detected a positive state for detector module 53, PPM 100 may arm the safety function. One embodiment of the safety function is depicted in FIG. 3. Once the Safety function is armed, PPM 100 will continuously monitor the state of detector module 53. PPM 100 will monitor the state of detector module 53 for the amount of time specified in the Active Limit variable (i.e., jogging time). Once the amount of time in the Active Limit variable has been reached, PPM 100 will cease to monitor the state of detector module 53 and disarm the Safety function. In other embodiments, other specific approaches to detecting and monitoring are contemplated. In one such approach, the detector module is monitored based on its movement, physical location, or both. For example, the mobile device's accelerometer can be monitored to detect motion of the device If, after the safety function has been armed, but before the amount of time in the Active Limit variable has expired, PPM 100 detects a negative state from detector module 53, PPM 100 may start an Alarm Timer. Upon activation of the Alarm Timer, the user will have an amount of time defined by the Alarm Timer Limit variable to deactivate the Alarm Timer (e.g., 15 seconds). In one embodiment, the Alarm Timer can be activated when PPM 100 detects a negative state from detector module 53, followed immediately by a positive state from detector module 53 (i.e., removal and reinsertion of the headset plug into the headset jack). PPM 100 may allow the user to deactivate the Alarm Timer in any number of different ways including interacting with the user interface by unlocking the phone, quitting out of the Module, or entering a password, or by re-inserting the headset plug or other comparable accessory.

Figure 4:
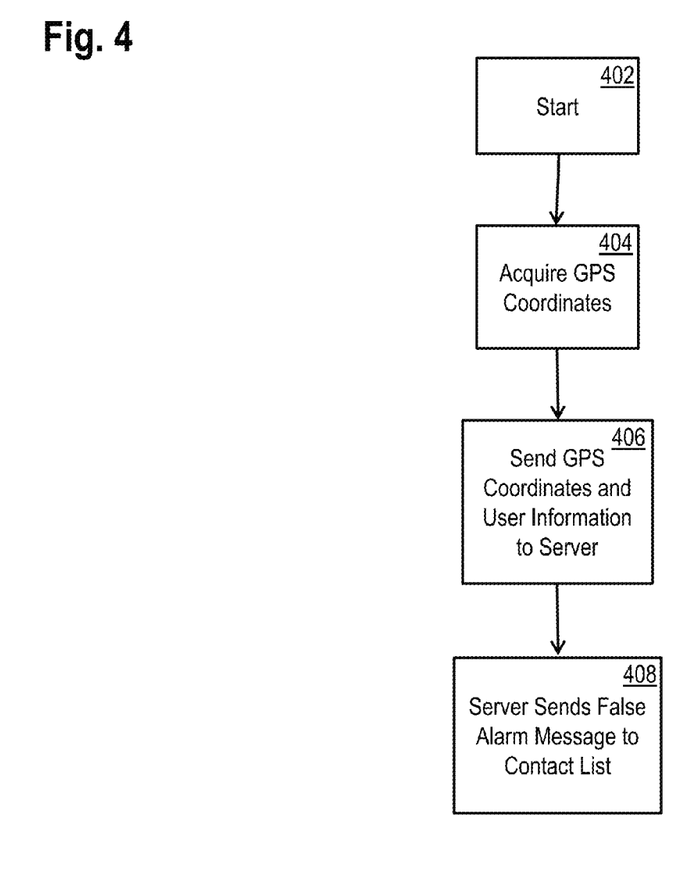
FIG. 4 illustrates an example of an Emergency Procedure that one embodiment of the invention may perform.

If the user does not deactivate the Alarm Timer within the Alarm Timer Limit, PPM 100 will initiate an Emergency Procedure. One embodiment of the Emergency Procedure is depicted in Block 200 and in FIG. 4. Once PPM 100 has initiated the Emergency Procedure, PPM 100, using the mobile device's location services, will acquire the geographic location of the headset (this may include either a GPS coordinate location or a network based location, or both). PPM 100 will then send the geographic location of the mobile device along with identification information associated with the account to a server.

In one embodiment, as depicted in process B in block 220 of FIG. 2B, the user can select an Emergency Start button, which, when selected, will ask the user to verify whether or not the Emergency Procedure (i.e., send email, text, or dial a phone number) should be initiated. If the emergency is verified by the user, the Emergency Procedure will be activated immediately, and the user can then be brought to a post-triggered alarm screen.

Once the Emergency Procedure has been initiated and the server receives the user's information from the mobile device, the server will send the emergency text and e-mail messages associated with the user's account to the contacts stored in the user's emergency contact list. In other embodiments, PPM 100 can acquire the geographic location of the mobile device before initiation of the Emergency Procedure. In still other embodiments, the emergency messages can originate from the mobile device instead of the server. As described in Block 210, the user can unlock the mobile device after the Emergency Procedure has been initiated in order to, for example, directly call or send text messages to the contacts on the user's contact list.

Figure 5:
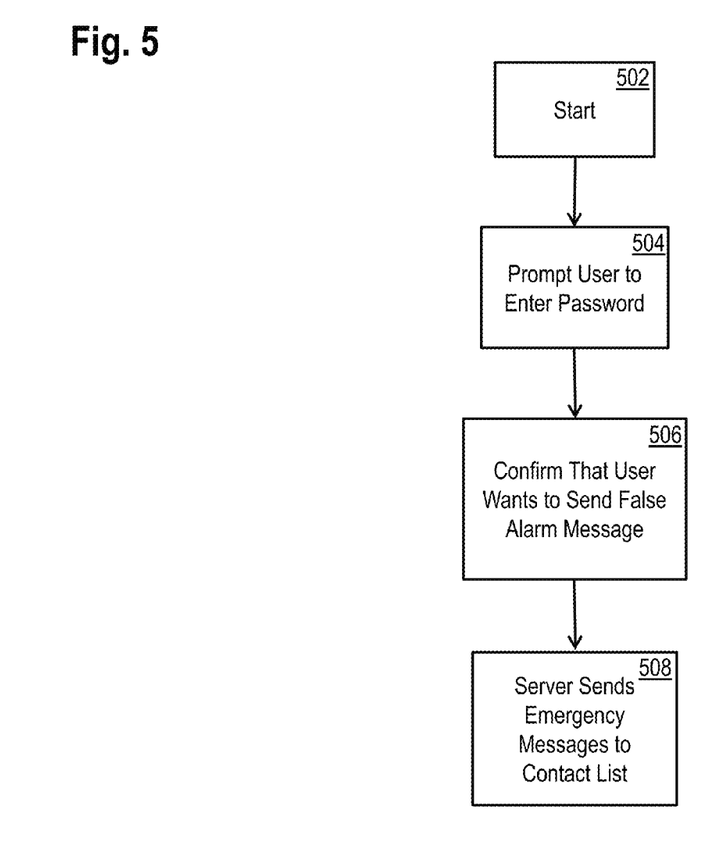
FIG. 5 illustrates an example of a False Alarm Procedure that one embodiment of the invention may perform.

In other embodiments, as indicted in sequence C, the user can unlock the mobile device after the Emergency Procedure has been initiated and access the False Alarm Section described in Block 230 of FIG. 2C, and in FIG. 5. After sending the emergency messages, PPM 100 may display options for the user to call emergency services, any of the numbers on the user's contact list, or to initiate the False Emergency Procedure. The False Emergency Procedure is described in Block 230. In this embodiment, the user can be prompted to verify that a False Alarm notification should be sent. If verified, the user will be prompted to enter a 4-digit password, which, if correct, will send False Alarm messages to any of the numbers specified on the user's contact list.

Referring back to block 150, one of the other buttons that may be displayed on the Main Interface Page can be a button titled "Emergency Start." If a user presses this button, PPM 100 may immediately initiate the Emergency Procedure. In other embodiments, this button may have a different name.

Another one of the buttons that may be displayed on the Main Interface Page can be titled "False Alarm E-mail." If a user presses this button, PPM 100 will immediately initiate False Emergency Procedure. In some embodiments, PPM 100 may require the user to enter a password before sending the False Alarm message. In some embodiments, the "False Alarm E-mail" button may have a different name.

Yet another control, indicated at D, that may be displayed on the Main Interface Page can be titled "General Settings," as described in Block 240 of FIG. 2D. If a user presses this button, PPM 100 may display various settings that the user may edit. Some of these settings may allow the user to change the contacts stored in the emergency contact list or edit their contact information. If a new contact is added, the user will be prompted to send that contact an introductory email explaining the general significance and use of the PPM 100. Other settings may allow the user to edit the emergency text message, emergency e-mail message, and false alarm message. Still other settings may allow the user to change the password associated with the False Alarm Procedure and toggle the ability of PPM 100 to send text messages during the execution of the Emergency Procedure. Still other settings may allow the user to toggle the text alerting system on or off or to change the 4-digit false alarm password.

In a related embodiment, a plurality of different user inputs are supported by engaging/disengaging the accessory from the accessory port. For example, in one embodiment, a sequence of engage-disengage-engage within a predetermined time window, e.g., 3 seconds, can indicate a first user input; whereas a sequence of engage-disengage (without further re-re-engagement) within the time window can indicate a different user input.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An electronic mobile device configured to accept inconspicuous user input, the device comprising:
   a housing;
   computer circuitry situated within the housing and including a processor operatively coupled to a data store, a user interface including a display and a user input device, and wireless communications circuitry;
   an accessory port interfaced with the computer circuitry and including an electrical connector configured to engage with an accessory external to the housing;
   wherein the computer circuitry is configured to implement a port detector module that provides an indication of whether the accessory port is engaged with the accessory;
   wherein the computer circuitry stores an application that implements a personal protection module, wherein the application, when executed, causes the computer circuitry to execute a sequence of operations in response to at least one change in the indication of the port detector module, the sequence of operations not requiring operation of the accessory, and wherein the sequence of operations includes an alarm sequence that transmits an alarm message to a remote recipient via the communications circuitry; and
   wherein the personal protection module is configured to enter into an armed state in response to a user input, wherein in the armed state the personal protection module permits activation of the alarm sequence, and wherein out of the armed state the personal protection module prevents activation of the alarm sequence.

2. The electronic mobile device of claim 1, wherein the accessory port is a headset port.

3. The electronic mobile device of claim 1, wherein the at least one change in the indication of the port detector module is a disengagement of the accessory from the accessory port.

4. The electronic mobile device of claim 1, wherein the alarm sequence causes the electronic mobile device to transmit the alarm message following a specified time period in response to the at least one change in the indication of the port detector module.

5. The electronic mobile device of claim 1, wherein the alarm message includes an indication of a current location of the electronic mobile device.

6. The electronic mobile device of claim 1, wherein the alarm message includes a multimedia recording made by the electronic mobile device.

7. The electronic mobile device of claim 1, wherein the alarm message includes preconfigured medical information about a user of the electronic mobile device.

8. The electronic mobile device of claim 1, wherein the alarm sequence further includes transmission, via the wireless communications circuitry, of a false alarm message to a predetermined alarm message recipient in response to receiving a deactivation input from a user if a prior transmission of an alarm message to the alarm message recipient has been performed.

9. The electronic mobile device of claim 1, wherein the personal protection module is configured to automatically exit the armed state in response to a lapse of a predefined period of time following entry into the armed state.

10. The electronic mobile device of claim 1, wherein the personal protection module is configured to interrupt the sequence of operations in response to a subsequent change in the indication of the port detector module within a predefined period of time.

11. The electronic mobile device of claim 10, wherein the subsequent change in the indication of the port detector module includes a re-engagement of the accessory with the accessory port.

12. The electronic mobile device of claim 1, wherein the at least one change in the indication of the port detector module is a series of at least one disengagement and at least one engagement of the accessory with the accessory port.

13. The electronic mobile device of claim 12, wherein the at least one change in the indication of the port detector module is a detection of a removal and an immediate re-engagement thereafter of the accessory with the accessory port.

14. The electronic mobile device of claim 1, further comprising:
a multimedia recording module executable on the computer circuitry; and
wherein the sequence of operations includes initiating multimedia recording via the multimedia recording module.

15. The electronic mobile device of claim 1, wherein the sequence of operations includes an operation that monitors user input for a deactivation input and in response to the deactivation input, modifies or deactivates the sequence of operations.

16. The electronic mobile device of claim 15, wherein deactivation input includes an engagement or disengagement of the accessory with the accessory port.

17. A method for processing user input to a mobile device that includes computer circuitry including a processor operatively coupled to a data store, a user interface including a display and a user input device, and wireless communications circuitry, and an accessory port having an electrical connector configured to engage with an accessory external to the mobile device, the method comprising:
automatically detecting, by the mobile device, whether the accessory port is engaged with an accessory; and
automatically executing, by the mobile device, a preconfigured sequence of operations in response to at least one change in a detected state of engagement of the accessory port, the preconfigured sequence not requiring usage of the accessory, the preconfigured sequence of operations including an alarm sequence that transmits an alarm message to a remote recipient via the wireless communications circuitry; and
wherein the mobile device is configured to enter into an armed state in response to a user input, wherein in the armed state the mobile device permits automatically executing the alarm sequence, and wherein out of the armed state the mobile device prevents activation of the alarm sequence.

18. A non-transitory computer-readable medium comprising:
instructions, executable on a mobile device that includes computer circuitry including a processor operatively coupled to a data store, a user interface including a display and a user input device, and wireless communications circuitry, and an accessory port having an electrical connector configured to engage with an accessory external to the mobile device, wherein the instructions, when executed, cause the mobile device to automatically activate an alarm sequence in response to at least one change in an indication of whether the accessory port is engaged with an accessory, and wherein the instructions, when executed, cause the mobile device to enter into an armed state in response to a user input, wherein in the armed state the mobile device permits activation of the alarm sequence, and wherein out of the armed state the mobile device prevents activation of the alarm sequence.

* * * * *